(12) United States Patent
Huang et al.

(10) Patent No.: US 7,471,425 B2
(45) Date of Patent: Dec. 30, 2008

(54) SCANNING METHOD BY USING SHEET FEED SCANNER

(76) Inventors: Yin-Chun Huang, 6F. No. 72-11, Lane 531, Sec. 1, Kuang-Fu Rd., Hsinchu (TW); Po-Hua Fang, 3F., No. 55, Alley 16, Lane 2, Kuang-Fu St., Yungho, Taipei Hsien (TW); Ji-Mei Tsuei, No. 13, Lane 142, Sec. 3, Chunghua Rd., Hsinchu (TW)

( * ) Notice: Subject to any disclaimer, the term of this patent is extended or adjusted under 35 U.S.C. 154(b) by 606 days.

(21) Appl. No.: 10/063,434

(22) Filed: Apr. 23, 2002

(65) Prior Publication Data
US 2003/0197903 A1    Oct. 23, 2003

(51) Int. Cl.
*H04N 1/04* (2006.01)
(52) U.S. Cl. .................. 358/474; 358/496; 358/497
(58) Field of Classification Search ............... 358/505, 358/474, 413, 486, 497, 494, 496, 400, 471, 358/495, 491, 498; 347/262
See application file for complete search history.

(56) References Cited

U.S. PATENT DOCUMENTS

| | | | | |
|---|---|---|---|---|
| 5,452,108 A | * | 9/1995 | Muramatsu | 358/474 |
| 5,914,745 A | * | 6/1999 | Eguchi | 347/262 |
| 6,108,456 A | * | 8/2000 | Yamamoto | 382/270 |
| 6,115,149 A | * | 9/2000 | Lai et al. | 358/505 |
| 6,388,774 B1 | * | 5/2002 | Kurata et al. | 358/474 |
| 6,493,113 B1 | * | 12/2002 | Fujii et al. | 358/488 |
| 6,646,768 B1 | * | 11/2003 | Andersen et al. | 358/474 |
| 6,707,582 B2 | * | 3/2004 | Chen | 358/474 |
| 7,136,200 B2 | * | 11/2006 | Chen et al. | 358/474 |
| 2001/0050699 A1 | * | 12/2001 | Hickman | 347/37 |
| 2002/0080429 A1 | * | 6/2002 | Honbo et al. | 358/505 |
| 2003/0043418 A1 | * | 3/2003 | Tsutsumi | 358/412 |
| 2003/0095296 A1 | * | 5/2003 | Terashima et al. | 358/498 |

* cited by examiner

*Primary Examiner*—Jerome Grant, II
(74) *Attorney, Agent, or Firm*—Stolowitz Ford Cowger LLP

(57) ABSTRACT

A scanning method in which a scanning head moves back and forth to scan a paper sheet located in a scanning window is disclosed. The method of the present invention includes the steps of a) making the paper sheet go forward a first distance into the scanning window; b) the scanning head scanning a portion of the paper sheet; c) the transmission mechanism driving the scanning head to move a second distance in a first direction, wherein the second distance is smaller than the first distance; d) repeating the steps b) and c) until the scanning head completely scans a plurality of portions of the paper sheet in the scanning region; e) repeating the steps a), b), c) and d), except that the scanning head moves in a second direction opposite to the first; f) repeating the steps a), b), c), d), and e), the movement of the scanning head alternating between a first and second direction, until the scanning head completely scans the paper sheet to be scanned.

30 Claims, 3 Drawing Sheets

SCANNING METHOD BY USING SHEET FEED SCANNER

BACKGROUND OF THE INVENTION

1. Field of the Invention

The present invention relates to a scanning method by using a sheet feed scanner. More specifically, the present invention relates to a scanning method with improved resolution by using a sheet feed scanner.

2. Description of the Related Art

As the operation performance of computers increases, and the Internet and multimedia are widely used, more image input devices such as digital cameras and optical scanners are increasingly required. Different from digital cameras that directly output the digital data of the image, the optical scanners have to transform analog data of the image into digital signals before the data is transmitted to the computer. According to the input of the document image, the optical scanners can be divided into pocket scanners, sheet feed scanners, drum scanners, and flatbed scanners. A sheet feed scanner manufactured by contemporary technology has 600 dpi of optical resolution with a contact image sensor (CIS).

FIG. 1, is a schematic view of a conventional sheet feed scanner. The sheet feed scanner 100 includes a sheet feeder 110, and a scan module 130. The sheet feed scanner 110 serves to convey a paper sheet 150. The scan module 130 scans the sheet paper 150 conveyed from the sheet feeder 110. The sheet feeder 110 includes a conveying guide 112, a plurality of rollers 114 and a scanning window 116. The sheet paper 150 is conveyed along the conveying guide 112. The rollers 114 are arranged on the conveying guide 112, with two of the rollers 114 rolling in contact with each other so that the paper sheet 150 can be transmitted by the rollers to pass between the two rollers 114 and go forward. When a motor (not shown) drives the rollers 114 to rotate, the rollers 114 convey the paper sheet 150 in a moving direction 120. An axis 115 of each of the rollers 114 is perpendicular to the moving direction 120 of the paper sheet 150. Furthermore, a scanning window 116 is arranged under the sheet feeder 110. The scanning module 130 includes a stationary scanning head 132 that is fixed in the scan module 130. The stationary scanning head 132 scans the paper sheet 150, which is conveyed from the sheet feeder 110, through the scanning window 116 of the sheet feeder 110.

In the above sheet feed scanner 100, the stationary scanning head 132 scans the paper sheet 150 when the paper sheet 150 is located above the scanning window 116. The scan resolution is determined on moving the paper sheet 150 by the motor and the rollers 114. The scan resolution thus obtained by such a sheet feeder 100 is low.

SUMMARY OF THE INVENTION

It is one object of the present invention to provide a scanning method using a sheet feed scanner, in which the scanning resolution can be greatly increased.

In order to achieve the above and other objectives of the present invention, a scanning method using a paper feed scanner is provided. The paper feed scanner comprises a sheet feeder attached thereon, a scanning head and a transmission mechanism, with the transmission mechanism driving the scanning head to scan a paper sheet fed from the sheet feeder into a scanning window. The method comprises: a) making the paper sheet go forward a first distance; b) the scanning head scanning a portion of the paper sheet; c) the transmission mechanism driving the scanning head to move a second distance in a first direction, wherein the second distance is smaller than the first distance; d) repeating the steps b) and c), until the scanning head completely scans a plurality of portions of the paper sheet in the scanning region; and e) repeating the steps a), b), c) and d), except that the scanning head moves in a second direction opposite to the first, until the scanning head completely scans all portions of the paper sheet to be scanned.

The sheet feeder comprises a conveying guide, and a plurality of rollers arranged on the conveying guide and in contact with each other to make a pair of rollers, and wherein the paper sheet is transmitted along the conveying guide by rotating the pair of rollers.

The sheet feeder further comprises a scanning window through which the scanning head scans the paper sheet. The length of the scanning window in the moving direction of the paper is larger than or equal to the first distance.

The scanning head moves back and forth to scan the paper sheet. Alternately, the scanning head can move in one way to scan the paper sheet. In view of the foregoing, in the scanning method of the present invention, the scanning resolution obtained by moving the scanning head can be controlled more precisely than that obtained by moving the paper sheet. Therefore, the whole scanning resolution can be greatly improved.

BRIEF DESCRIPTION OF THE DRAWINGS

It is to be understood that both the foregoing general description and the following detailed description are exemplary, and are intended to provide further explanation of the invention as claimed.

The accompanying drawings are included to provide a further understanding of the invention, and are incorporated in and constitute a part of this specification. The drawings illustrate embodiments of the invention and, together with the description, serve to explain the principle of the invention. In the drawings.

DETAILED DESCRIPTION

Figure 1:
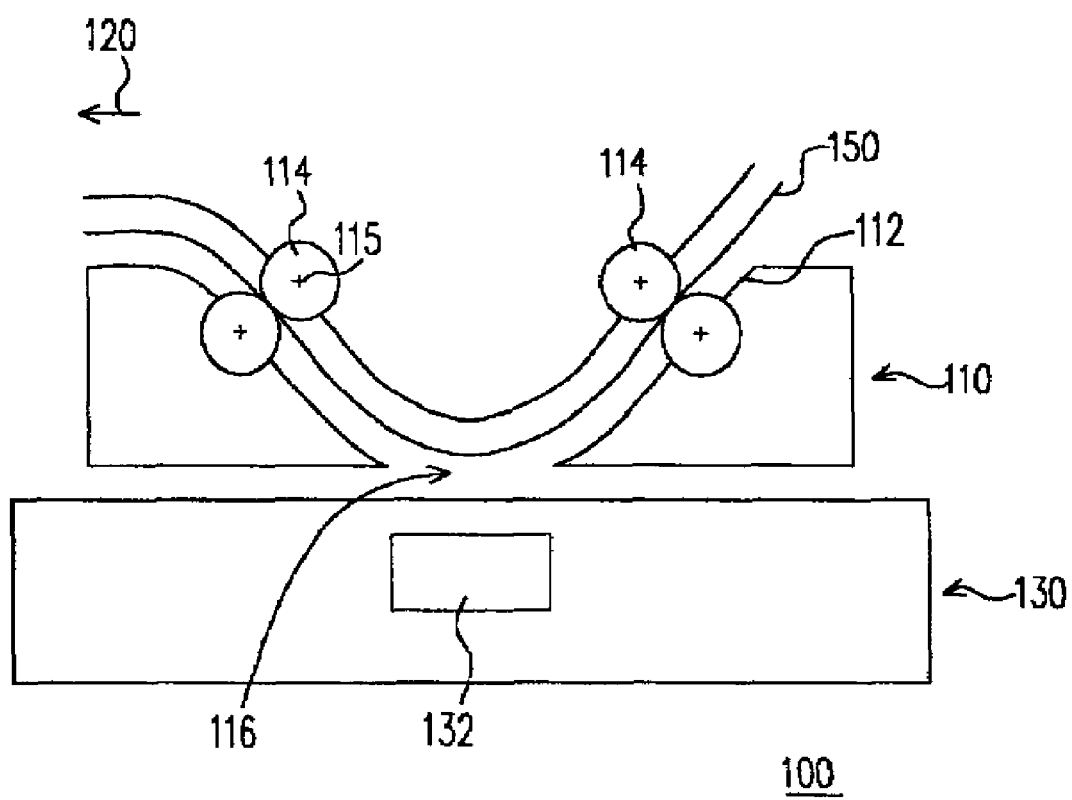
FIG. 1 is a schematic, cross-sectional view of a conventional sheet feed scanner.

Reference will now be made in detail to the present preferred embodiments of the invention, examples of which are illustrated in the accompanying drawings. Whenever possible, the same reference numbers are used in the drawings and the description to refer to the same or like parts.

Figure 2:
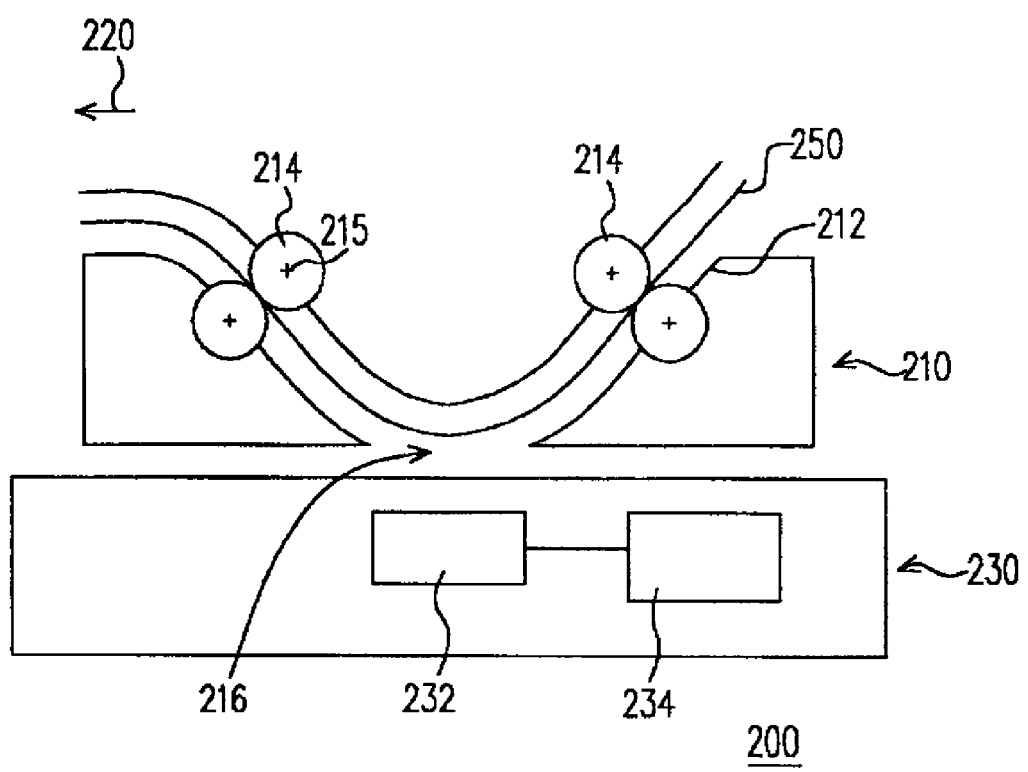
FIG. 2 is a schematic cross-sectional view of a sheet feed scanner according to one embodiment of the present invention.

FIG. 2 is a schematic cross-sectional view of a sheet feed scanner according to one embodiment of the present invention. The sheet feed scanner 200 includes a sheet feeder 210 and a scan module 230. The sheet feed scanner 210 serves to convey a paper sheet 250. The scan module 230 scans the sheet paper 250 conveyed from the sheet feeder 210. The sheet feeder 210 includes a conveying guide 212, a plurality of rollers 214 and a scanning window 216. The sheet paper 250 is conveyed along the conveying guide 212. The rollers 214 are arranged on the conveying guide 212, with two of the rollers 214 rolling in contact with each other so that the paper sheet 250 can be transmitted by the pair of the rollers to pass between the two rollers 214 and go forward. When a motor (not shown) drives the rollers 214 to rotate, the rollers 214 convey the paper sheet 250 in a moving direction 220. An axis 215 of each of the rollers 214 is perpendicular to the moving direction 220 of the paper sheet 250. Furthermore, a scanning window 216 is arranged under the sheet feeder 210. The scanning module 230 includes a stationary scanning head 232, and a transmission mechanism 234. The transmission mechanism 234 drives the scanning head 232 back and forth to positions where it scans the paper sheet 250 conveyed by the sheet feeder 210, through the scanning window 216 of the sheet feeder 210. The transmission mechanism 234 consists of a gear set (not shown) and a stepping motor (not shown). The scanning head 232 goes forward step by step by the use of the gear set and the stepping motor of the transmission mechanism 234. The transmission mechanism 234 and the stepping motor are well known in the art and thus the detailed description thereof can be omitted.

Figure 3:
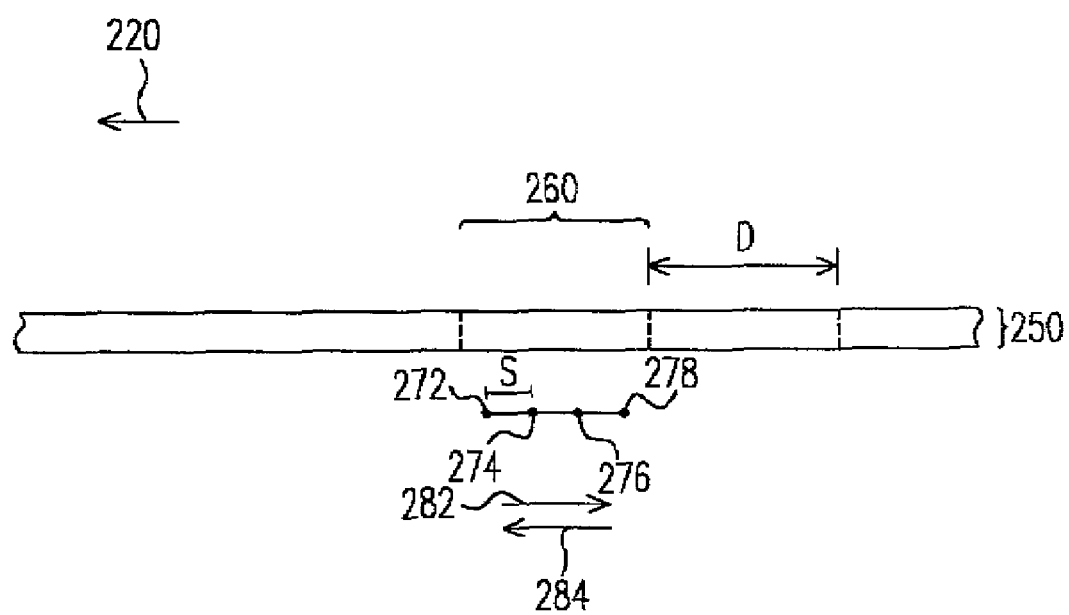
FIG. 3 is a schematic view showing the improvement of the sheet feed scanner during the sheet feed scanner operation.

FIG. 3 is a schematic view illustrating the scanning operation of the sheet feed scanner according to one embodiment of the present invention. In the conventional scanner, a scanning resolution is obtained after the paper sheet is sent to the scanning region by the stepping motor and the rollers 214. However, with the aid of moving the scanning head 232 as illustrated in the present invention, the scanning resolution can be greatly enhanced. With reference to FIGS. 2 and 3, the paper sheet 250 is placed into the sheet feeder 210. By the control of the stepping motor and the rollers 214, the paper sheet 250 travels forward a first distance D in the moving direction, and then stops. After the paper sheet 250 stops, a scanning region 260 of the paper sheet 250 is exposed through the scanning window 216. In this embodiment, a center of the scanning head 232 is located at a first position 272 which faces the scanning region 260. After the paper sheet 250 stops, the scanning head 232 scans a corresponding portion of the paper sheet accessible from the first position 272, then the center of the scanning head 232 travels a second distance S from the first position 272 to a second position 274 in the first scanning direction 282. The first distance D is larger than the second distance S. After the scanning head 232 stops, the scanning head 232 scans a corresponding portion of paper sheet accessible from the second position 274. The scanning head 232 then travels a second distance S in the first scanning direction 282, and moves to a third position 276. After the scanning head 232 stops at the third position, the scanning head 232 scans a corresponding portion of the paper sheet 250 accessible from the third position 276. The scanning head 232 then travels a second distance S in the first scanning direction 282, and moves to a fourth position 278. Similarly, after the scanning head stops, the scanning head 232 scans a corresponding portion of the paper sheet 250 accessible from the fourth position 278. It should be noted that an area where the scanning head 232 scans from the first position 272 to the fourth position 278 is smaller than that of the scanning region 260. Furthermore, the scanning window 216 is designed such that a length of the scanning window 216 in the direction 220 of the paper sheet 250 is larger than or equal to the distance D.

The paper sheet 250 further moves a first distance D in the direction 220, and then stops. The scanned portion of the paper sheet 250 leaves the scanning window 216, and then a non-scanned portion of the paper sheet 250 goes to be located in the scanning region 260, while the center of the scanning head 232 is located at the fourth position 278. After the paper sheet 250 stops, the scanning head 232 scans a corresponding portion of the paper sheet 250 accessible from the fourth position 278. The scanning head 232 then travels a second distance S to the third position 276 in the second scanning direction 284. After the scanning head 232 stops, the scanning head 232 scans a corresponding portion of the paper sheet 250 accessible from the third position 276. The scanning head 232 further travels a second distance S to the second position 274 in the second scanning direction 284. After the scanning head 232 stops, the scanning head 232 scans a corresponding portion of the paper sheet 250 accessible from the second position 274. The scanning head 232 further moves to the first position 272 in the second moving direction 284 with a second distance S, and scans a corresponding portion of the paper sheet 250 accessible from the first position 272. The scanner 200 repeats the above steps until the whole paper sheet 250 is scanned.

In the scanning method by using the sheet feed scanner according to the present invention, the scanning resolution of paper sheet 250 can be greatly increased by moving the scanning head 232.

In the preferred embodiment of the present invention, after the paper sheet goes forward a first distance, the scanning head scans the paper sheet at four positions, i.e., the first position, the second position, the third position, and the fourth position. The four positions are equally spaced from each other. However, the invention is not limited to four positions, any number of the positions can be used.

The scanner of the present invention scans the paper sheet in two directions. One-way scanning can also be applied to the present invention. With reference to FIG. 2 and FIG. 3, the scanning head 232 scans from the first position 272 to the fourth position 278, going forward a second distance S each time. After reaching the fourth position 278, the sheet feeder 210 transmits the paper sheet 250 forward a first distance D. The scanning head 272 moves back to the first position 272. After the paper sheet 250 moves a distance D, the scanning head 232 moves from the first position 272 by the second distance S step by step until it reaches the fourth position 278. The one-way scanning is repeated until the whole paper document is scanned.

In view of foregoing, in the scanning method of the present invention, the scanning resolution obtained by moving the scanning head can be controlled more precisely than that obtained by moving the paper sheet alone. Therefore, the whole scanning resolution can be greatly improved.

It will be apparent to those skilled in the art that various modifications and variations can be made to the structure of the present invention without departing from the scope or spirit of the invention. In view of the forgoing, it is intended that the present invention cover modifications and variations of this invention provided they fall within the scope of the following claims and their equivalents.

The invention claimed is:

1. A method comprising:
moving a document a first distance in a first direction;
scanning a portion of said document with a scanning head;
moving said scanning head a second distance in the first direction, wherein said second distance is smaller than said first distance;
scanning another portion of said document; and
repeating said moving the document, said scanning, and said moving said scanning head to scan a plurality of portions of said document.

2. The method of claim 1, wherein repeating said moving the document, said scanning, and said moving said scanning head to scan a plurality of portions of said document includes moving the scanning head in a single direction.

3. The method of claim 1, further comprises moving said scanning head in a second direction opposite to said first direction wherein repeating said moving the document, said scanning, and said moving said scanning head to scan a plurality of portions of said document includes moving the scanning head in more than one direction.

4. The method of claim 1, wherein said method is carried out in a sheet feeder, and wherein said sheet feeder includes a plurality of rollers rotatably coupled to a conveying guide for moving said document.

5. The method of claim 4, wherein said sheet feeder includes a scanning window, and wherein a length of said scanning window is larger than or equal to said first distance.

6. The method of claim 1, wherein the scanning head remains stationary while scanning the portions of the document.

7. A method comprising:
moving a document a first distance in a first direction over a scanning window;
scanning a portion of said document with a scanning head in an original initial position;
moving said scanning head a second distance in the first direction or in a second direction that is opposite of the first direction, wherein the second distance is smaller than the first distance;
repeating said scanning and said moving said scanning head until said scanning head scans a plurality of portions of said document over said scanning window;
returning said scanning head to said original position; and,
repeating said moving said document, said scanning, said moving said scanning head, and said repeating until said document is substantially scanned.

8. The method of claim 7, wherein said scanning head moves back and forth in the first direction and the second direction to scan said document.

9. The method of claim 7, wherein the scanning head remains stationary in the original initial position while scanning the portion of the document.

10. A method comprising:
scanning a first portion of a side of a document located in a first document position relative to a scanning window with a scanning head located in a first head position;
moving the scanning head to a second head position after scanning the first portion of the side of the document;
scanning a second portion of the side of the document with the scanning head located in the second head position;
moving the document to a second document position relative to the scanning window; and
scanning a third portion of the side of the document with the document in the second position, wherein the scanning head remains stationary in the first head position while scanning the first portion of the side of the document and the scanning head remains stationary in the second head position while scanning the second portion of the side of the document.

11. The method of claim 10 wherein the scanning head is located in a third head position when scanning the third portion of the side of the document, the third head position being different than the first and second head positions.

12. The method of claim 10 wherein the scanning head is located in at least one of the first and second head position when scanning the third portion of the side of the document.

13. The method of claim 10, further comprising moving the scanning head a first distance to the first head position, wherein moving the scanning head to a second head position includes moving the scanning head a second distance from the first head position to the second head position, the second distance being smaller than the first distance.

14. A system comprising:
a sheet feeder capable of moving a document a first distance in a first direction over a scanning window;
a scanning head capable of scanning a first portion of said document over said scanning window;
a stepping motor capable of moving said scanning head a second distance in the first direction,
wherein said second distance is smaller than said first distance;
wherein said scanning head is further capable of scanning a second portion of said document over said scanning window; and
wherein said sheet feeder is further capable of again moving said document said first distance over said scanning window.

15. A system of claim 14, wherein said sheet feeder is further capable of moving said document further over said scanning window and said scanning head is further capable of scanning a third portion of said document over said scanning window, and wherein said stepping motor is further capable of again moving said scanning head said second distance in said first direction.

16. The system of claim 15, wherein said scanning head is further capable of moving back and forth in a scanning direction to scan said document, the scanning direction including the first direction and a second direction opposite of the first direction.

17. The system of claim 15, wherein said sheet feeder comprises a conveying guide, and a plurality of rollers arranged on said conveying guide, and wherein at least two of said plurality of rollers are in contact with each other, such that said document may be moved at least in part by rotating the at least two of said plurality of rollers.

18. The system of claim 15, wherein a dimension of said scanning window is larger than or equal to said first distance.

19. The system of claim 14, wherein the scanning head remains stationary while scanning the first portion of the document over the scanning window and the scanning head remains stationary while scanning the second portion of the document over the scanning window.

20. An apparatus comprising:
means for moving a document a first distance in a first direction over a scanning window;
means for scanning a first portion of said document over said scanning window;
means for moving said means for scanning a second distance in the first direction, wherein said second distance is smaller than said first distance;
said means for scanning being capable of scanning a second portion of said document over said scanning window; and
said means for moving said document being capable of moving said document further over said scanning window.

21. The apparatus of claim 20, wherein:
said means for scanning being capable of scanning a third portion of said document over said scanning window; and
said means for moving said means for scanning being capable of again moving said means for scanning said second distance in said first direction.

22. The apparatus of claim 20, further comprising: means for moving said means for scanning back and forth in a scanning direction to scan said document, the scanning direction including the first direction and a second direction opposite of the first direction.

23. The apparatus of claim 20, wherein a dimension of said scanning window is larger than or equal to said first distance.

24. The apparatus of claim 20, wherein the means for scanning remains stationary while scanning the first portion of the document over the scanning window and the means for scanning remains stationary while scanning the second portion of the document over the scanning window.

25. A method comprising:
  moving a document a first distance in a first direction over a scanning window;
  with a scanning head, scanning a first portion of said document over said scanning window;
  moving said scanning head a second distance in the first direction or a second direction that is opposite of the first direction, wherein said second distance is smaller than said first distance;
  scanning a second portion of said document over said scanning window;
  moving said document further over said scanning window in the first direction; and
  with said scanning head, scanning a third portion of said document over said scanning window.

26. The method of claim 25, further comprising:
  moving said scanning head said second distance in said first direction again; and
  scanning a fourth portion of said document.

27. The method of claim 26, further comprising: moving said scanning head back and forth in a scanning direction to scan said document, the scanning direction including the first direction and the second direction.

28. The method of claim 26, wherein moving a document comprises rotating at least two of a plurality of rollers, wherein said plurality of rollers are at least in part coupled to a sheet feeder.

29. The method of claim 26, wherein a dimension of said scanning window is larger than or equal to said first distance.

30. The method of claim 25, wherein the scanning head remains stationary while scanning the first portion of the document and the scanning head remains stationary while scanning the second portion of the document.

\* \* \* \* \*